United States Patent [19]
Morrow et al.

[11] Patent Number: 5,868,945
[45] Date of Patent: *Feb. 9, 1999

[54] PROCESS OF TREATING PRODUCED WATER WITH OZONE

[75] Inventors: Lawrence Robert Morrow, Sugar Land; Wilson Kirkpatrick Martir, Houston; Hossein Aghazeynali, Sugar Land, all of Tex.; David Edmund Wright, Bakersfield, Calif.

[73] Assignee: Texaco Inc, White Plains, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 741,657

[22] Filed: Aug. 29, 1996

[51] Int. Cl.$^6$ ..................................................... C02F 1/78
[52] U.S. Cl. ..................... 210/760; 210/766; 210/908; 210/912
[58] Field of Search .................................. 210/758, 759, 210/760, 766, 908, 912

[56] References Cited

U.S. PATENT DOCUMENTS

| | | | |
|---|---|---|---|
| 3,779,909 | 12/1973 | Wisfeld et al. | 210/760 |
| 3,856,671 | 12/1974 | Lee et al. | 210/760 |
| 4,256,574 | 3/1981 | Bhargava | 210/760 |
| 4,751,005 | 6/1988 | Mitsui et al. | 210/760 |
| 4,767,543 | 8/1988 | Chornet et al. | 210/909 |
| 5,145,587 | 9/1992 | Ishii et al. | 210/760 |
| 5,266,216 | 11/1993 | Agueda et al. | 210/760 |
| 5,364,537 | 11/1994 | Paillard | 210/760 |
| 5,462,670 | 10/1995 | Guess | 210/912 |
| 5,492,633 | 2/1996 | Moniwa et al. | 210/760 |

Primary Examiner—Jay H. Woo
Assistant Examiner—Betsey J. Morrison
Attorney, Agent, or Firm—Henry H. Gibson; William J. Beard

[57] ABSTRACT

Ozonolysis is an effective process for improving the quality of produced water. A process for reducing the concentration of water soluble organic materials dissolved in produced water consists of introducing into the produced water a sufficient amount of gaseous ozone by use of a means for maximizing the collision frequency of ozone gas and the produced water. The temperature of the produced water is between from about 80° to about 180° F. The process renders a water effluent with markedly reduced oil and grease content. The water effluent can be used on land as a drinking or irrigation water supply source and may be safely discharged into navigable waters.

9 Claims, 4 Drawing Sheets

PROCESS OF TREATING PRODUCED WATER WITH OZONE

FIELD OF THE INVENTION

This invention relates to a method of treating produced water to degrade water soluble organic (WSOs) materials. In particular, the present invention relates to the degradation of certain water soluble petroleum organics from produced water by treatment of the produced water with ozone. Degradation may render partial or total oxidation products of the WSOs. The process of the invention further may be employed to reduce the concentration of metals in water. Aqueous streams treated in accordance with the invention may either be used as the water supply for drinking, in irrigation or discharged into either untreated or navigable waters.

BACKGROUND OF THE INVENTION

Oil well production fluid refers to the composition obtained from earth formations such as geological reservoirs through oil wells. Such fluid normally consists of oil, natural gas and water. Typically it consists of at least 90% water and 10% or less of crude oil. Dissolved materials, such as the anionic salts of organic acids, are usually present in the water.

At surface level, the constituents of oil well production fluids are physically separated by such separation techniques as bulk separators and dissolved air flotation. In particular, the marketable constituents—gas and oil—are separated from the water. The separated water stream is referred to as "produced water". Produced water contains the above described water soluble organic materials. Conventional phase separation techniques will not remove such water soluble compounds from the aqueous phase.

Governmental regulations, in recognition of the need for conservation of the environment, prohibit the discharge of produced water into navigable waters without the removal first of the water soluble organics. In fact, under the Federal Water Pollution Control Act, as amended in 1972, it is unlawful to discharge any pollutant into a navigable water without first obtaining a permit under section 402 of the Control Act. 33 U.S.C.A. § 1311(a) (1977 Supp.).

After the produced water is separated from the oil and gas (of the oil well production fluid) it is necessary, assuming the produced water is to be discharged to surface waters, to measure the oil and grease content of the effluent produced water stream by gravimetric analysis. Oil and grease, which can include water soluble organic materials, must be reduced to 42 mg/l maximum and 29 mg/l monthly average for discharge to Outer Continental Shelf waters and, depending on EPA regional rules, must be reduced to 10–35 mg/l at onshore facilities.

Alternatively, in other areas where water is in short supply, such as in those areas adjacent to the Pacific coast, it is highly desirable to recycle the produced water for use on land. In order to make effective use of the water stream on land, it is necessary to decrease the oil and grease content of the aqueous effluent.

New methods are needed to readily and easily treat water soluble organic materials (WSOs) in produced water. One possibility is presented by the use of ozone—long considered to be a powerful oxidizing agent.

Extensively used in Europe as a bactericide, ozone recently has gained acceptance in the United States as a substitute for chlorine gas. Waste treatment facilities have also realized the advantages of using ozone for degradation of such natural organic matter as humic and fulvic acids. One of the main advantages of using ozone for the oxidation of hydrocarbons is its selectivity for forming nontoxic "oxygenated" products during partial oxidation. Furthermore, if needed, ozonolysis can be driven towards the total oxidation of those molecules forming carbon dioxide and water.

To date, no documentation exists addressing the successful use of ozonolysis with produced water. In large part this is due to the fact that ozone is relatively insoluble at the elevated temperatures in which produced water is conventionally processed. Thus, in order to make ozonolysis feasible it has long been considered necessary to first pretreat waters by cooling. In addition, pH adjustments, excessively long contact times and the use of such chemicals as hydrogen peroxide and, in some cases, UV lamps, have been considered to be mandatory. For most oil field applications these steps are not only uneconomical but also impractical.

The present invention provides a simple, economical procedure for accomplishing the stated objective. While known methods can reduce the content of water soluble organics to the desired low level, they are relatively complex and/or expensive in comparison with the process of the present invention.

SUMMARY OF THE INVENTION

In accordance with the present invention, there is provided a process for the degradation of WSOs in produced water. Produced water typically contains a small amount, e.g., between about 100 to about 1,000 ppm or more, of such materials.

By practicing the present invention one is able to treat a large volume of produced water and recover considerable amounts of purified water. For example, typically an operator may treat 900,000 barrels of produced water per day.

The invention consists of treating produced water with ozone at gas/liquid ratios ("G/L") of about 0.15 to about 0.6. The ozone is introduced to the produced water by a mass transfer means. The produced water is maintained at its natural processing temperature, typically between 80° and 180° F. The reaction is practically instantaneous with over 95% efficiency realized from a single pass.

BRIEF DESCRIPTION OF THE DRAWINGS

FIGS. I and II are schematic block diagrams of the process of the invention.

FIG. III is a diagram illustrating a means for the in-situ generation of ozone for use in the invention.

Figure 2:
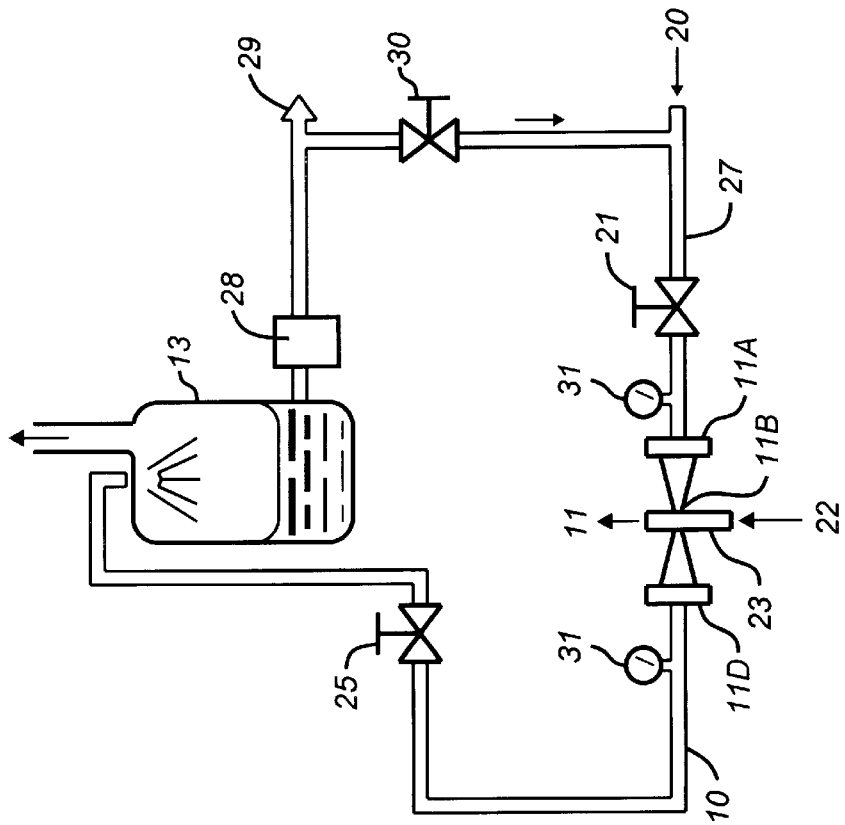
Figure 1:
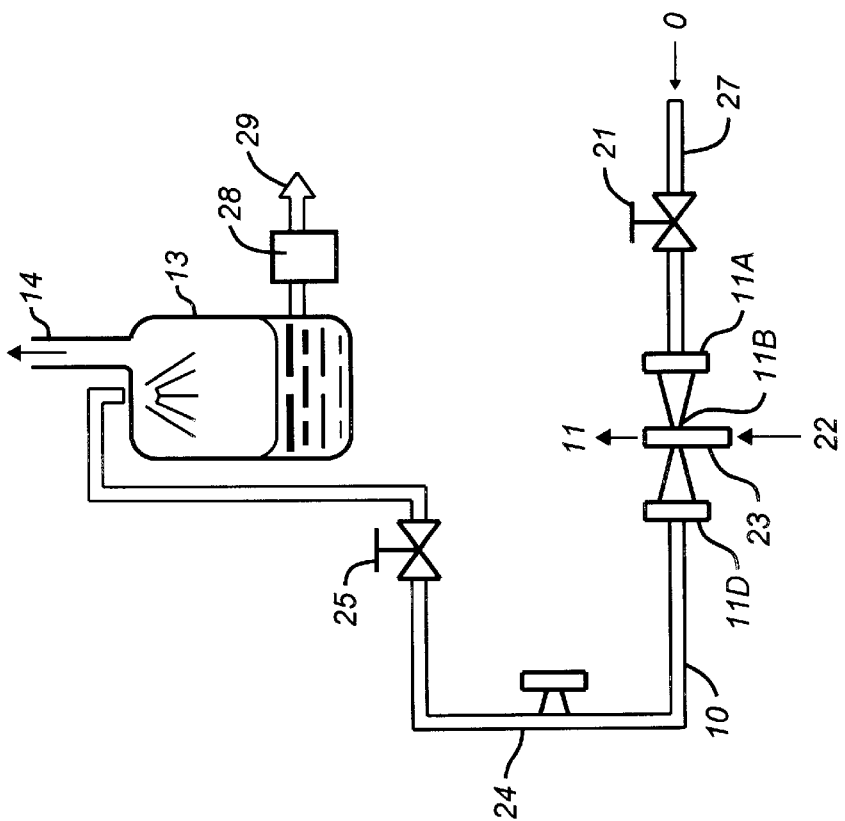
Figure 3:
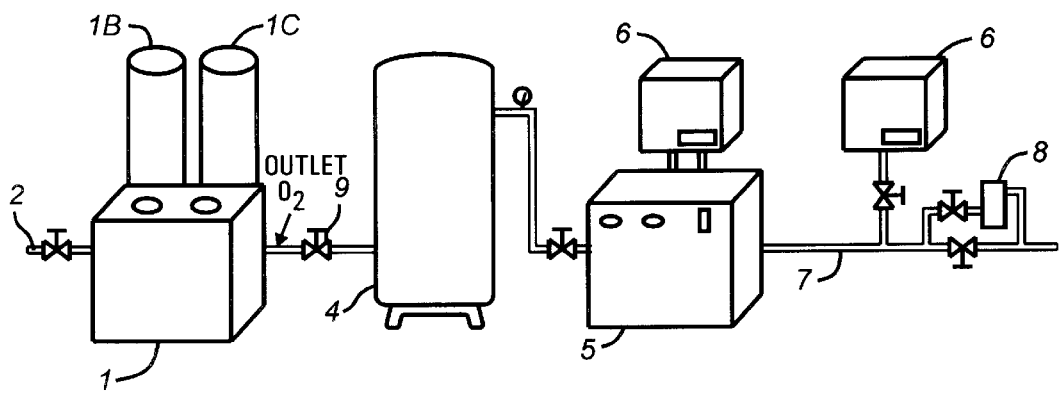
Figure 4:
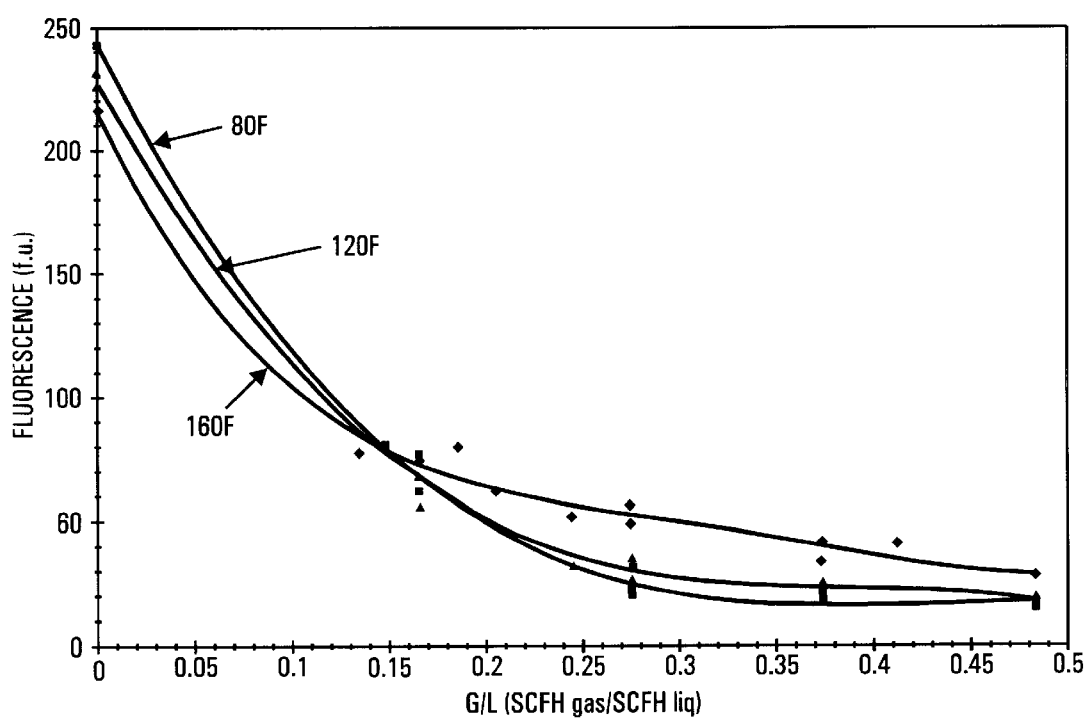
Figure 5:
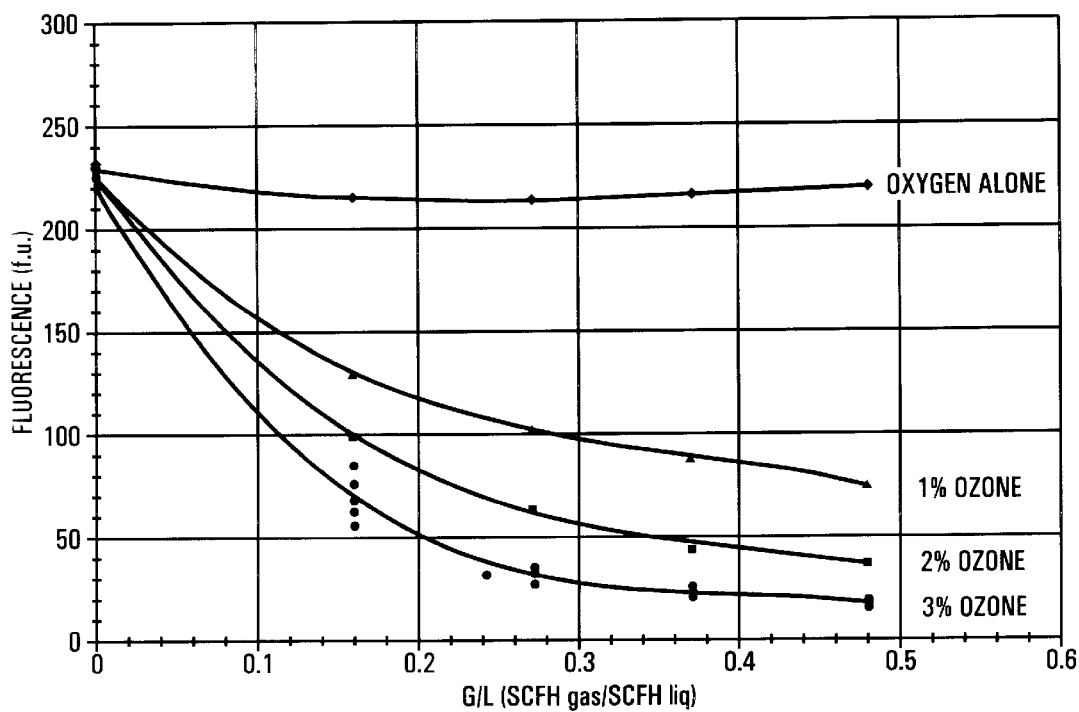
Figure 6:
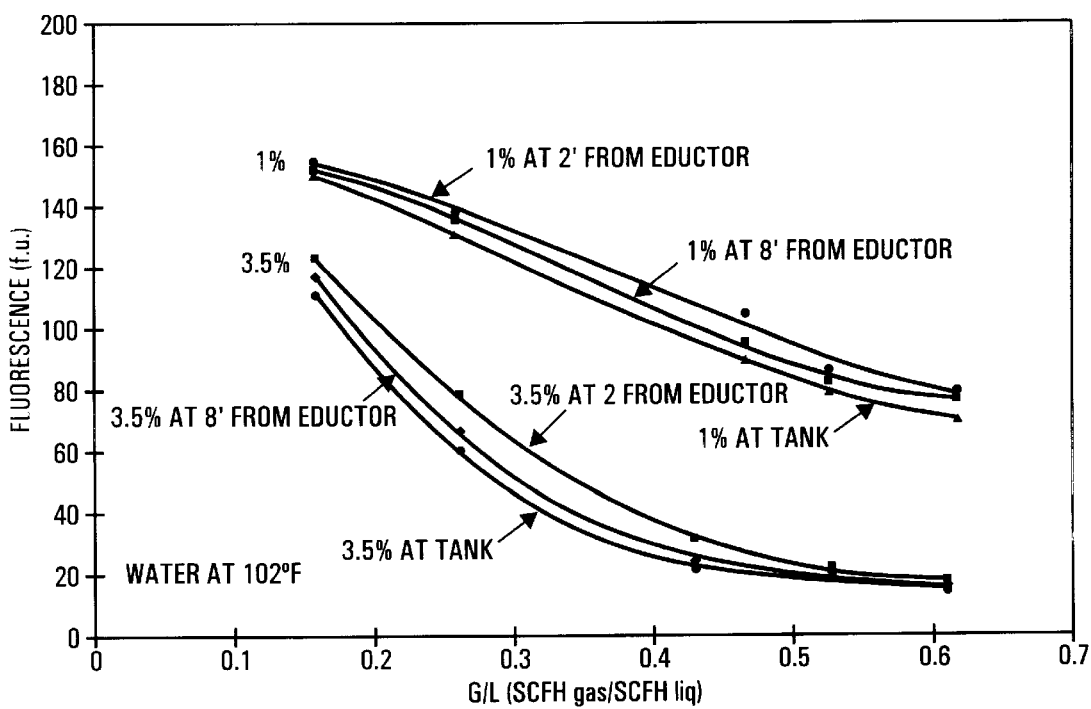
Figure 7:
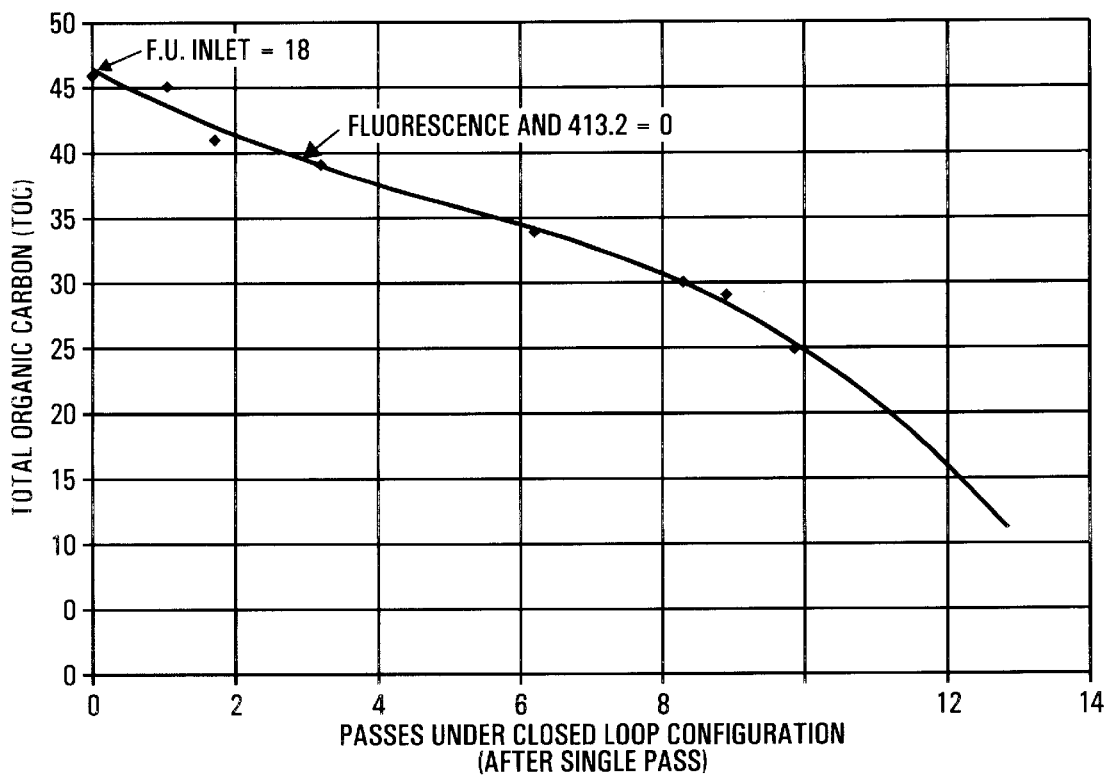
Figure 8:
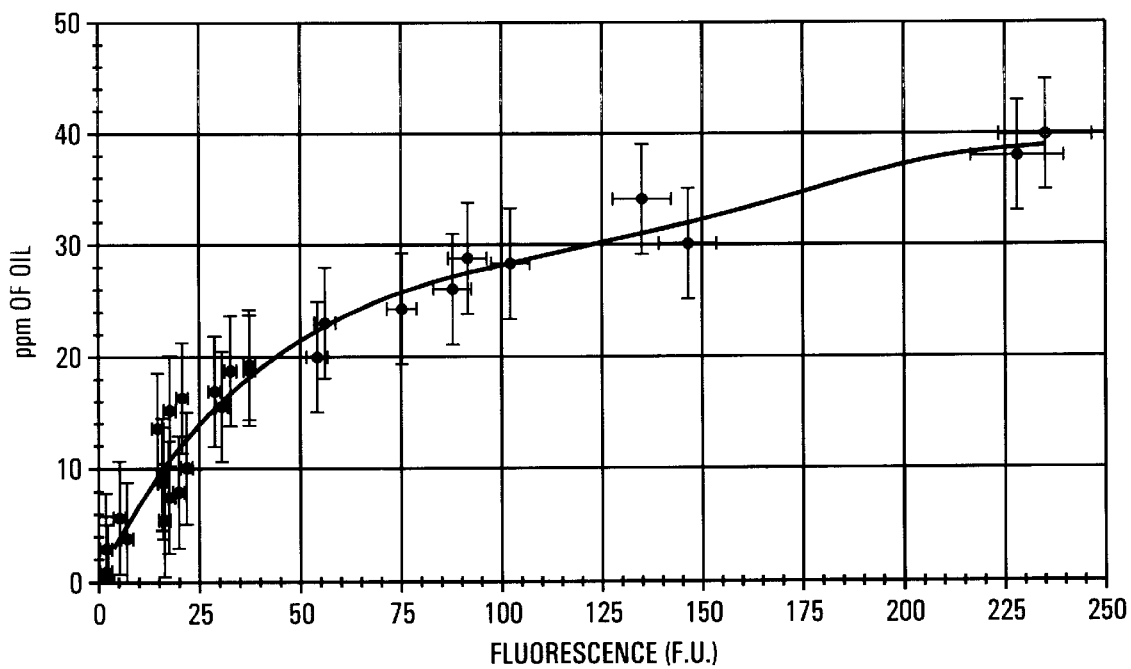

FIG. IV demonstrates the effect of G/L on fluorescence at 3% ozone for produced water temperatures of 80° F., 120° F. and 160° F.

FIG. V displays the effect of G/L on fluorescence for produced water without ozone and with 1%, 2%, and 3% ozone (by weight) at a water temperature of 120° F.

FIG. VI demonstrates the effect of G/L on fluorescence for various contact times.

FIG. VII demonstrates the total organic carbon reductions as a function of number of passes under a closed loop configuration at 88° F.

FIG. VIII demonstrates the fluorescence versus oil and grease measurements of treated produced water in accordance with the invention using EPA 413.2 methodology.

DETAILED DESCRIPTION OF THE PREFERRED EMBODIMENTS

The process of the invention is directed to the treatment of produced water with ozone in order to degrade WSO materials. WSOs are those water soluble organic materials found in petroleum and may include the monocarboxylic acids of the naphthene (alicyclic) series of hydrocarbons as well as such petroleum acidic substances as substituted phenols, mercaptans and long chain ketones. Typically, WSOs are naphthenic acids of the formula:

$$R(CH_2)_n COOH$$

wherein R may be a cyclic moiety composed of 1, 2, 3 or more rings and n is 1 or higher. Representative acids include cyclopentaneacetic acid and trans-2,2,6-trimethylcyclohexylacetic acid. Any given crude oil may contain as many as 120 or more different petroleum acids.

WSOs treated in accordance with the invention are either lower molecular weight hydrocarbons from partial oxidation or $CO_2$ and water from total oxidation. The process of the invention is cost effective and culminates in the reduction of oil and grease levels caused by the WSOs in the produced water. The purified water may be either returned to navigable waters or used on land as an irrigation water source. In addition, the purified water may be used as drinking water.

The total concentration of ozone introduced to the produced water during the process is determinative as to if the resulting product(s) are partial oxidation products or total oxidation products. In partial oxidation, the WSOs are modified. Partial oxidation products include lower molecular weight organic compounds such as alkenes, alkanes and alcohols. Total oxidation destroys the WSOs to render carbon dioxide and water as products. A simplified schematic of the reaction of ozone and naphthenic acids (a typical WSO) can be represented as:

$$O_3 + R(CH_2)_n COOH \longrightarrow CO_2 + H_2O$$

where R is a cyclic moiety composed of 1,2,3, or more rings and n=1, or more (integer). Partial oxidation products are generally more biodegradable than the WSOs. During partial oxidation reactions, the organic molecules are modified and rearranged; the total number of carbon atoms in solution remaining basically unchanged.

The process of the invention may consist of a simple ozonation pass or multiple ozonation passes. The latter is conducted in a closed loop. Over 95 wt. % of the WSO has been seen to undergo at least partial oxidation in a single ozonation pass. In any given ozonation pass, the amount of ozone typically imparted to the produced water in accordance with the invention is between from about 10 to greater than 300 ppm. While the amount of ozone normally imparted in a single ozonation pass is dependent on the power of the generator being used, many commercial generators dictate the dosage amount to be from about 28 to about 32 ppm. Larger applied dosages of ozone (either from a single ozonation pass or culminating from successive passes in the closed loop configuration) principally lead to total oxidation products—carbon dioxide and water. The total organic content (TOC) of the produced water has been observed to be zero when the total amount of ozone dosage in the inventive process is between from about 90 to about 250 ppm. Total oxidation products are generally obtained when the (culminative) ozone concentration is between from about 90 to greater than 250 ppm.

In accordance with the process of the invention the ozone is introduced to the produced water by a means which increases the collision frequency of ozone gas and produced water. In other words, such means enhances the mass transfer of ozone into the produced water. As used herein, the term "mass transfer means" shall refer to any system wherein the molecular collisions of ozone molecules and produced water molecules are maximized such that at least 50 wt. % of the produced water undergoes at least partial combustion. As high as 98 wt. % of the produced water has been documented to be degraded in a single ozonation pass with an average of at least 95 wt. percent. Mass transfer means shall include eductors as schematically represented in FIGS. I and II and as described below. In addition, it shall include fine bubble diffusion contactors. Such contactors contain inlet ports for the produced water and ozone, both of which lead to a contact interface area essentially comprising a fritted disc. The interaction of ozone gas bubbles and produced water occurs at the fritted disc, often referred to as the contact interface area.

The gas/liquid (G/L) ratio, defined as the ratio of the standard cubic feet/hour of gas containing ozone and the produced water in the mass transfer means, is between from about 0.15 to about 0.6. Most effective G/L ratios for a water temperature of 102° F. are generally between about 0.25 and about 0.35. The relationship between G/L and the total concentration of ozone is basically linear with the destruction of WSOs. At G/L ratios in excess of 0.45, the ozonation reaction becomes limited, principally in the gas phase by molecular deactivation of the ozone radical molecules.

The pH of the produced water feedstream of the invention is typically unaffected by the ozonation reaction. Typically, the pH is maintained at levels between about 6.0 to about 9.0.

The temperature of the produced water being treated in the process of the invention is typically between 80° and 180° F., preferably between 120° and 160° F. Cooling of the produced water is unnecessary. The reaction is practically instantaneous.

At the designated temperatures, the solubility of ozone is essentially zero. The degradation reaction is believed to be attributed to the stated G/L ratio. The pressure differential within the mass transfer means often attributes further to the degradation reaction. In a single ozonation pass, an average of over 95 wt. % of the produced water is degraded upon exiting the mass transfer means.

The process of the invention may further employ chemical additives to enhance the oxidation of the WSOs. Normally such additives may be mixed with the ozone prior to its introduction into the mass transfer means. Such additives may especially be preferred when only a single pass injection of ozone is employed. Preferred additives are hydrogen peroxide, tetrabutyl ammonium hydroxide, antimony trichloride, zinc chloride, copper chloride, copper (I) nitrate, potassium alum, and the alkali and alkaline earth metal salts (especially sodium and calcium) of perchloric acid. Such additives further are effective in the lowering of metal or total organic carbon (TOC) of the produced water specially done in a single pass ozonation process.

Since ozone can be neither stored or transported, it is produced on site. Commercially available ozone generators, using air or oxygen as the feed gas, are typically used. The unreacted feed gas further serves as the carrier gas for the ozone radical molecules.

Exemplary of the ozone reactor for use in the invention is that displayed in FIG. III which includes a separation unit 1 for separation of oxygen from the air stream introduced at inlet 2. The air stream substantially stripped of moisture, nitrogen and $CO_2$ exits the separator unit via ports 1B and 1C. The separated oxygen stream enters holding tank 4 from meter 9 where it is metered into generator 5. Ozone analyzer 6 may optionally be attached to generator 5 and/or exit line 7 for monitoring of the amount of ozone produced in the process. The ozone gas volume is then metered and controlled by using a gas flowmeter 8. Suitable for use as the ozone injector is an in-line venturi such as venturi model no. 1584A available from Mazzei Injector Corporation of Bakersfield, Calif.

As the injected ozone enters the mass transfer means, it collides with the produced water feedstream. At the temperatures in which the process is run, the reaction between the produced water and ozone occurs mainly in the gas phase. The treated water exits the mass transfer means as a finely dispersed liquid phase.

The combination of mixing process coupled with the use of the designated G/L ratio and high concentrations of ozone (generally between from about 3 to about 4 percent by weight) gives a very fast and effective reaction. Under such conditions, a large percentage of WSOs are degraded, as evidenced in a reduction in fluorescence values. In addition, solids in the produced water do not interfere with the reaction between the WSOs and ozone. The reaction between WSOs and ozone proceeds without the need for U.V. lamps.

Referring now to FIG. I, a feedstream of produced water is introduced through water inlet 20 into trumpet-shaped eductor 11 at relatively high pressures after passing through metering pump 21. The produced water enters the eductor at the first tapered end 11A. A partial vacuum is created by the decreased pressure at the ozone intake opening 22 (at constriction point 11B of tapered end 11A) to draw in the ozone. The incoming tapered end of the eductor 11A decreases the pressure within the throat chamber 23. The produced water at this stage is extremely hot, and can flash into the vapor phase by the decrease in pressure. Thus, the ozone gas essentially reacts with a gaseous stream of produced water; therefore the reaction of the produced water and atomized ozone occurs at the molecular level.

The outgoing tapered end of the eductor 11D feeding into the feed line expands the admixture whereupon it exits as a liquid stream into feed line 12. The produced water passing through the eductor 11 is subjected to a pressure drop. The differential pressure between the inlet and the outlet of the eductor is generally between from about 6 to about 45, preferably from about 7 to about 25, most preferably between from about 8 to about 10 psi. In the preferred embodiment, the inlet pressure is generally between from about 10 to about 15 psi and the outlet pressure is generally between from about 2 to about 5 psi. Higher pressure differentials can be obtained using high capacity pumps.

While the eductor means is shown in FIG. I as being substantially horizontally disposed, it is to be understood that any configuration may be used as long as the mass transfer means deliver the micro-fine bubbles to effectively mix the ozone with the produced water.

The small ozone gas bubbles interact with the produced water in the eductor to cause almost an instantaneous reaction. In practice, an average of about 95 wt. % of the produced water undergoes at least partial combustion during a single ozonation pass prior to entry of the treated produced water feedstream into feed line 12.

Maintenance of the G/L ratios between 0.15 and 0.6 accounts for the almost instantaneous reaction occurring between the gaseous ozone particles and the produced water. Extremely large volumes of produced water may be treated in accordance with the process. For instance, successful treatment of over 10,000 gallons of produced water per minute may be made using the process of the invention.

Since the treated product exiting the eductor through 11D has been substantially, if not completely, oxidized, the length of feed line 12 is immaterial. For the most part, the length and shape of the feedline will be dependent upon space limitations and design preferences of the user. If need be, one or more outtake ports 24 may be placed along feedline 12 to monitor the oil and grease content or another desired chemical-physical property of the treated stream. If desired, the ozone dissolved in the treated stream may be removed in degasser 13 prior to exiting at outlet 14. The treated stream typically enters the degassser 13 after leaving metering pump 25. In addition, separation unit 28 may be placed, either upstream or downstream from degasser 13, for the removal of metals from the treated stream prior to its collection at exit port 29.

Efficacy of the ozonation is observed by measuring the total organic carbon (TOC) content of the treated stream. The TOC level decreases as the amount of carbon dioxide and water (resulting from total oxidation) increases.

In a second configuration, the treated produced water may be recycled to ensure the production of more highly degraded (partial oxidation) products or total oxidation products. FIG. II represents a closed loop process in accordance with the invention. Optionally pressure gauges 31 may be installed upstream and downstream from the mass transfer means. The treated produced water stream not collected at exit port 29 re-enters the mass transfer means for subsequent treatment with ozone gas after passing through metering pump 30. Alternatively, the recycled stream exiting pump 30 may be admixed with incoming produced water feedstream 20. (Metering valves 25 and 30 primarily function to control flow.) However, due to the extremely high level of efficiency illustrated in the process of the invention, such recycling of the treated stream is often unwarranted. The TOC after three complete circulations within the closed loop has been observed to decrease from 28–36 to 20–24. After 10 passes, the TOC has been seen to be decreased to 15 or lower. See further the data illustrated in FIG. VII and discussed below.

The process of the invention offers several advantages over the processes of the prior art directed to the reduction of WSOs. First, the process of the invention is inexpensive since it does not require burdensome equipment such as U.V. lamps. In addition, no limitations on cooling of the produced water are necessary since the reaction is practically instantaneous. In addition to being inexpensive, the process of the invention is safe to the environment since the treated water will not affect the growth, reproduction or survival rate of sea animals. (Actually the toxicity of the produced water is greatly reduced after treatment with this ozonation invention.)

Further, oil and grease values, based on EPA's 413.2 methodology, of the produced water are dramatically reduced by the process of the invention. For instance, reductions in oil and grease values to less than 5 ppm are common in a single pass ozonation by use of the invention. This represents a 90% reduction from original values. Oil and grease levels of 1–5 ppm have further been recorded under optimized conditions.

The process of the invention may further be used to reduce the concentration of metals in contaminated water streams, including produced water. Such metals include barium, arsenic, manganese, boron, selenium, copper, antimony and zinc. Typically, the water feedstream can contain from about 1 to about 100 ppb of such metals. Treatment of metal contaminated water in accordance with the invention reduces the solubility of the metal(s). When oxidized by ozone, the metals precipitate within degassing tank 13. A separator 28 may be added to the unit for the collection of the metal(s). Satisfactory as the separator are filter screens. Under a single pass of the ozonation process of the invention, the concentration of such metals is reduced from about 10 to about 90%.

Further, the process of the invention may be used to purify process plant effluents as well as to purify effluents in the wood treating industry, pulp and paper industry and mining industry. It further may be used in the production of ultra-pure water in the semiconductor industry as well as in groundwater remediation.

The process of the invention is ideally suited to treat water soluble organic materials. The WSOs of produced water are often commonly referred to as "petroleum acids" and more specifically as "naphthenic acids". At the pH of the naturally occurring aqueous compositions, the acids may exist as anions in association with counterions of sodium, calcium, etc. For example, naphthenic acids can be regarded as being present as naphthenate salts. Often, therefore, petroleum acids in the aqueous phase of oil production fluids are in anionic form and may be more properly termed as petroleum carboxylate salts, phenates and other salts.

The following examples describe various embodiments of the invention. Other embodiments within the scope of the claims herein will be apparent to one of ordinary skill in the art from consideration of the specification or practice of the invention disclosed herein. It is intended that the specification and examples be considered exemplary only with the scope and spirit of the invention being indicated by the claims which follow the examples. Unless otherwise indicated all percentages herein are on a weight percent basis.

EXAMPLE 1

The effect of ozonolysis on the produced water in the Kern River field in California was examined using the schematic pathway set forth in FIG. I. The produced water in the Kern River field was found to contain about 28–32 ppm of WSO molecules, as measuring using EPA's 413.2 methodology. These molecules have been characterized using mass-mass spectroscopy. Their chemical makeup is comprised of about 200 to 300 different types of naphthenic acids, each being in the ppm to ppb concentration range.

Fluorescence was chosen as the principal monitoring tool since the WSOs in the Kern River field produced water are mainly comprised of a stable mixture of naphthenic acids which have a very consistent fluorescence pattern. The degradation of these naphthenic acids during ozonolysis was tracked continuously by comparing the fluorescence of the ozonated produced water with that of the raw produced water. In the absence of free oil the fluorescence signal intensity can be correlated to oil and grease values (ppm of oil). The relationship between fluorescence value (F.U.) units and oil and grease values (ppm of oil) of Kern River field produced water, in accordance with EPA 413.2, is given in FIG. VIII.

The oxidation of the WSOs during ozonolysis at 160° F. was monitored using fluorescence spectroscopy. The on line fluorometer was operated using excitation and emission wavelengths of 380 nm and 420 nm, respectively. (These wavelengths were chosen to avoid any possible interference from field treating chemicals and residual dissolved ozone.) The instrument was calibrated at 200 fluorescence units (f.u.), using raw produced water and at 0 f.u. with produced water made free of WSOs (by using an activated carbon filter).

The oxidation products have a significantly smaller fluorescence yield at the stated excitation and emission wavelengths. The fluorescence signal intensity can be correlated to oil and grease values (ppm of oil). At very low fluorescence values (0–2 f.u.) the minimum oil and grease measurement was between 0.1 and 1.0 ppm.

The partial oxidation of the naphthenic acids during ozonolysis at 160° F. was further documented by collecting samples and analyzing them using Total Scanning Fluorescence (TSF) spectroscopy. With this technique the behavior of the WSOs was monitored over a wide band of excitation and emission wavelengths, including the range of 380 nm to 420 nm used by the on line fluorometer. At low applied ozone dosages, the overall peak intensity was decreased by 82% with a only a small change in spectral shifts compared to the untreated water. At higher ozone dosages the signal intensity was reduced as much as by 98%, followed by a significant spectral shift of the maximum emission and excitation wavelengths towards the low end of the spectrum (the region for simpler molecules). These results clearly confirm that at the higher ozone dosages the original naphthenic molecules undergo partial and total oxidation reactions. These results were confirmed by TOC analysis and Liquid Ion Chromatography (LIC). A summary of the fluorescence data is shown in Table I.

TABLE I

| Water Sample | TOTAL SCANNING Fluorescence Intensity Max. | FLUORO-METER Maximum Excitation and Emission (nm) | ON LINE FLUORO-METER Fluorescence Intensity at 380/420 (Ex/Em) |
|---|---|---|---|
| No Ozone | 15,573 | 230/345 | 235–215 |
| Ozone = 9.76 ppm | 2,761 | 230/328 | 54 |
| Ozone = 17.6 ppm | 1070 | 225/290 | 30.7 |
| Ozone = 33.6 ppm | 384 | 225/290 | 2–4 |

EXAMPLE 2

The effect of the temperature on the produced water in the Kern River field in California was further examined using a single pass ozonation reactor as set forth in FIG. I at 80° F., 120° F. and 160° F. The ozone product concentration (percent by weight) was measured in the gas phase at the outlet of ozone generator and was maintained at 3%. The results are depicted in FIG. IV.

For a given gas/liquid ratio (>0.15) the effect of the water temperature on fluorescence was minimal. The ozonation reaction at 80° F. was slightly more effective (yielding a slightly lower fluorescence) than at 120° F. and 160° F. This difference can also be attributed to variation in the temperature compensation program of the fluoronator. The small gain, however, does not justify the cost of cooling the produced water.

For a given temperature the relationship between the G/L ratio and fluorescence indicates that the ozonation reaction is favored at higher G/L ratios. At 80° F. and 120° F. this trend continues until ratios of 0.25–0.30 are reached. In general, at higher ratios the reaction becomes independent of the G/L value. At 160° F. the dependence of the ozonation reaction and G/L ratios is extended until a ratio of about 0.4 is reached.

EXAMPLE 3

The effect of G/L ratios on fluorescence on the produced water in the Kern River field in California at varying levels of concentration of ozone was further examined using a single pass ozonation reactor at 120° F. as set forth in FIG. I.

The results are depicted in FIG. V. As the concentration of ozone was increased from 1% to 3% the reaction efficiency was enhanced, as demonstrated by the lower fluorescence.

For a water temperature of 120° F., the most effective G/L ratios are between 0.25 and 0.35. From the Figure, it can be extrapolated that an ozone generator capable of producing above 4% wt. of ozone would reduce the fluorescence values (and thus, oil and grease values) to 0 ppm, under single pass configurations.

EXAMPLE 4

The effect of contact time during ozonation at 120° F. on the produced water in the Kern River field in California was further examined by measuring the fluorescence of the ozonated water at selected distances from the eductor and at the outgassing tank, 13 of FIG. I. During each reaction the ozonated water was sequentially sampled at 2 and 8 feet from the eductor and outgassing tank. The fluorescence data is presented in FIG. VI.

The data clearly indicates that, on average, about 86% to 98% of the total reduction in fluorescence occurs immediately at the eductor. An additional reduction of 2%–14% was obtained with secondary reactions. Contact time is therefore not as important a variable as the temperatures, ozone concentrations, and G/L ratios utilized with produced water. Similar results were also obtained when ozonating at 160° F.

EXAMPLES 5–12

The effect of various chemical additives as catalytic agents to enhance the oxidation of the WSOs was evaluated on the produced water in the Kern River field using a single pass ozonation reactor as set forth in FIG. I. The chemical was added at 27 of FIG. I in the amount ranging between from about $1-10^{-5}$ to about 1 wt percent. The "effectiveness" of the additives was measured by comparing the fluorescence of the baseline (prior to adding the chemical, but using ozone) with that observed during chemical addition. A list of the chemicals and the results obtained are included in Table III.

COMP. I and Example 5 were performed using 3.67 wt. % of ozone. Comp. Ex. II and Examples 6–12 were performed using a 3.2 wt. % of ozone. The ratings are simply a relative assessment that takes into consideration the magnitude of the reduction in fluorescence.

TABLE III

| Ex. No. | Chemical Additives | Effluent Fluorescence, Units Baseline- No Chemical | After Chemical | Ratings/ Comments; ppm determined by EPA 413.2 method |
|---|---|---|---|---|
| Comp. Ex. I | Ozone only | 15–16 | none used | 11 ppm |
| 5 | $H_2O_2$(25%) | 16–17 | too foamy to measure | good; 3 ppm |
| Comp. Ex. II | none | 26–29 | | |
| 6 | $NaHClO_4$(0.1%) | 26–29 | 11–12 | good |
| 7 | $NaHClO_4$(0.2%) | 26–29 | 6–7 | good |
| 8 | ZnCl(39.9 ppm) | 31 | 23 | good |
| 9 | Tetrabutyl ammonium hydroxide | 30 | 21 | good |
| 10 | CuCl(0.236 ppm) | 30 | 23 | good |
| 11 | (5%)$CaHClO_4$ | 27 | 4.5 | good |
| 12 | (10% $NaHClO_4$ | 28 | 3 | good |

EXAMPLES 13–34

The effect of ozonolysis on the removal of metals in produced water maintained at 160° F. in the Kern River field was made optionally in the presence of chemical additives in the amounts described above for Examples 5–12. The concentrations (in ppm) of these metals and the pH measurements (before and after chemical addition) for single pass ozonolysis are listed in Table IV. When only one value is listed, it corresponds to the outlet effluent after chemical addition. The chemical dosages ranged from 0.1 ppm to 10,000 ppm.

TABLE IV

| Example # | Dosage of metal salts injected, ppm | Chemical Additives Other qualitative additives | Concetrations of metals (in ppm) | | | | | Metal salts (outlet level), ppm |
|---|---|---|---|---|---|---|---|---|
| | | | Mn | B | As | Ba | pH | |
| 13 | none | $NaHClO_4$ | 0.008 | 0.98 | 0.028 | 0.100 | 7.66 | N.A. |
| 14 | none | $NaHClO_4$ | <0.003 | 0.94 | 0.027 | 0.100 | 7.46 | N.A. |
| 15 | none | $KMnO_4$ | 0.342 | 0.96 | 0.023 | 0.052 | 8.04 | N.A. |
| 16 | none | $KMnO_4$/$NaHClO_4$ | 0.167 | 0.95 | 0.025 | 0.065 | 7.79 | N.A. |
| 17 | none | $K_2S_2O_8$ | 0.686 | 0.88 | 0.026 | 0.097 | 8.39 | N.A. |
| 78 | none | $K_2S_2O_8$ | 0.672 | 0.94 | 0.029 | 0.108 | 8.00 | N.A. |
| 19 | none | $K_2S_2O_8$/$NaHClO_4$ | 0.452 | 0.92 | 0.028 | 0.106 | 8.30 | N.A. |
| 20 inlet | (Cu) 0.122 | | 0.092 | 0.94 | 0.024 | 0.101 | 8.24 | |
| 20 outlet | | | 0.492 | 0.88 | 0.025 | 0.113 | 8.34 | Cu = 0.07 |
| 21 inlet | (Sb) 1.92 | | 0.125 | 0.96 | 0.036 | 0.106 | 4.80 | |
| 21 outlet | | | 0.950 | 1.00 | 0.020 | 0.140 | 7.97 | Sb = 1.10 |
| 22 inlet | (Se) 0.172 | | 0.089 | 0.92 | 0.033 | 0.099 | 8.49 | |
| 22 outlet | | | 0.312 | 0.99 | 0.299 | 0.104 | 8.39 | Se = 0.08 |
| 23 inlet | (Zn) 39.89 | | 0.090 | 0.99 | 0.033 | 0.116 | 7.05 | |
| 23 outlet | | | 0.244 | 0.95 | 0.001 | 0.145 | 7.53 | Zn = 10.6 |

TABLE IV-continued

| Example # | Dosage of metal salts injected, ppm | Chemical Additives Other qualitative additives | Concentrations of metals (in ppm) | | | | pH | Metal salts (outlet level), ppm |
|---|---|---|---|---|---|---|---|---|
| | | | Mn | B | As | Ba | | |
| 24 | none | AlK$_2$(SO$_4$)$_2$ | 0.067 | 0.98 | 0.007 | 0.096 | 8.06 | N.A. |
| 25 | none | Tetrabutyl Ammonium Hydroxide (TBNOH) | 0.073 | 0.99 | 0.021 | 0.099 | 8.10 | N.A. |
| 26 | none | TBNOH/ NaHClO$_4$ | 0.067 | 1.00 | 0.019 | 0.098 | 8.4 | N.A. |
| 27 inlet | (Cu) 0.236 | | 0.087 | 0.98 | 0.030 | 0.098 | 8.2 | |
| 27 outlet | | | 0.084 | 0.96 | 0.023 | 0.098 | 8.15 | Cu = 0.04 |
| 28 inlet | (Cu) 0.176 | | 0.089 | 1.00 | 0.027 | 0.097 | 8.18 | |
| 28 outlet | | | 0.076 | 0.96 | 0.020 | 0.097 | 8.16 | Cu = 0.10 |
| 29 inlet | none | CaHClO$_4$ | 0.088 | 0.98 | 0.030 | 0.099 | 8.04 | |
| 29 outlet | | | 0.006 | 0.99 | 0.024 | 0.101 | 8.22 | N.A. |
| 30 | none | HCN | 0.074 | 1.00 | 0.032 | 0.098 | 8.00 | N.A. |
| 31 | none | NaHClO$_4$ | 0.089 | 0.98 | 0.030 | 0.108 | 7.92 | N.A. |
| 32 | none | NaHClO$_4$ | 0.003 | 0.98 | 0.034 | 0.090 | 7.98 | N.A. |
| 33 | no chemical additives/2 passes under closed loop (f.u. = 10) | | 0.064 | 0.94 | 0.034 | 0.083 | 8.35 | N.A. |
| 34 | no chemical additives/4 passes under closed loop (f.u. = 0) | | 0.064 | 0.95 | 0.037 | 0.090 | 7.97 | N.A. |
| Comp. Inlet | no Chem. Or Ozone | no Chem. Or Ozone | 0.081 | 1.00 | 0.033 | 0.099 | 8.13 | |
| outlet | after ozonation | after ozonation | 0.072 | 0.99 | 0.029 | 0.101 | 7.82 | N.A. |

The effect of the chemical additives on the concentrations of manganese and barium are illustrated in Examples 13, 14, 29 and 32 and in Examples 15 and 16, respectively. Boron levels were reduced in Examples 17–19 when the chemical additives KMnO$_4$, K$_2$S$_2$O$_4$ and NaHClO$_4$ were used.

As seen in Comp. Ex. 13, the concentration of the naturally occurring metals in the Kern River field produced water was unaffected by single pass ozonation. Under close loop ozonation (recirculation), however, the results from Ex. 34 show a decrease in the manganese, boron, and barium levels.

The inlet concentration of all metal ions (Examples 20–23, 27 and 28) were significantly reduced after ozonolysis. For example, when the inlet produced water was doped with selenium at 0.172 ppm and was ozonated, the concentration of selenium in the effluent was only 0.08 ppm, a 50% reduction. Similar yields were achieved for antimony and zinc.

EXAMPLE 35

Total organic carbon (TOC) analysis from ozonolysis of produced water at 88° F. in the Kern River field was examined using a Shimadzu TOC analyzer in a closed loop configuration as illustrated in FIG. II. Each individual pass corresponds to a 28 ppm ozone dosage. The results are graphically displayed in FIG. VII. Only after several consecutive passes (>3) were the TOC levels of the ozonated water lowered. Further, the fluorescence of the water drops to zero in advance of any significant changes in the TOC levels. This demonstrates that in this produced water the total oxidation of the WSOs is preceded by partial oxidation of the molecules.

As stated above, a TOC reduction is achieved by transforming organic molecules into CO$_2$ and H$_2$O. The data in FIG. VII clearly illustrates that after approximately 84 ppm of applied ozone (3 passes) the TOC levels become significantly lower than the baseline.

EXAMPLES 36–52

Total organic carbon (TOC) analysis from ozonolysis of produced water at 88° F. in the Kern River field in the presence of chemical additives was examined using the analyzer of Example 35. The ozonation was performed using a G/L ratio of 0.48 and 3.2 wt. % ozone. The results are summarized in Table V.

TABLE V

| Example # | Chemical Additive | TOC Analysis (ppm) | |
|---|---|---|---|
| | | Inlet before ozonation | Outlet, after ozonation |
| 36 | none | 31.6 | 31.1 |
| 37 | NaHClO$_4$ | | 31.0 |
| 38 | NaHClO$_4$ (0.1%) | | 29.8 |
| 39 | (0.2%) NaHClO$_4$/ KMnO$_4$ | | 27.2 |
| 40 | (0.5%) K$_2$S$_2$O$_8$ | | 30.1 |
| 41 | (5%) K$_2$S$_2$O$_8$ | | 31 |
| 42 | K$_2$SO$_4$/NaHClO$_4$ | | 28.3 |
| 43 | (0.1%)CuNO$_3$ | 30 | 29.4 |

TABLE V-continued

| Example # | Chemical Additive | TOC Analysis (ppm) Inlet before ozonation | Outlet, after ozonation |
|---|---|---|---|
| 44 | SbCl$_3$ | 22.5 | 14 |
| 45 | ZnCl$_2$ | | 28 |
| 46 | AlK(SO$_4$)$_2$ | 30 | 24 |
| 47 | TBNOH | | 43 |
| 48 | TBNOH/NaHClO$_4$ | | 50 |
| 49 | CuCl | 32.8 | 22.8 |
| 50 | CuCl/HCl | 30.5 | 28.2 |
| 51 | HClO$_4$ | | 28.5 |
| 52 | NaHClO$_4$ | | 25.7 |

Example 36 shows that the TOC levels of the raw and ozonated produced water are similar. The addition of metal salts such as cuprous chloride (CuCl), potassium alum AlK(SO$_4$)$_2$, and antimony trichloride (SbC13) catalyze the total oxidation of the WSOs rendering a reduction in the TOC levels.

From the foregoing, it will be observed that numerous variations and modifications may be effected without departing from the true spirit and scope of the novel concepts of the invention.

What is claimed is:

1. A method of degrading water soluble organics (WSOs) in produced water which comprises feeding into a mass transfer means a feedstream of produced water having a temperature between from about 104° F. to about 180° F. and a stream of ozone containing gas under a differential pressure, and reacting the feedstream, while in a finely dispersed state, with said ozone containing gas for a time sufficient to substantially render reduction products of the WSOs and wherein the ratio of standard cubic feet/hour of ozone containing gas to produced water is between from about 0.15 to about 0.50, and wherein said pressure differential within the mass transfer means is between from about 6 to about 45 psi.

2. The method of claim 1 wherein said ratio of standard cubic feet/hour of ozone containing gas to produced water is between from about 0.15 to about 0.45.

3. The method of claim 1 wherein said differential pressure is between from about 8 to about 10 psi.

4. The method of claim 1 which further comprises continuously re-introducing the treated feedstream containing reduction products of the WSOs into the mass transfer means for a time sufficient to obtain total oxidation products.

5. The method of claim 1 wherein a chemical additive selected from the group consisting of hydrogen peroxide, tetrabutyl ammonium hydroxide, antimony trichloride, zinc chloride, copper chloride, copper nitrate, potassium alum and the alkali and alkaline earth metal salts of perchloric acid is admixed with said ozone containing gas prior to said ozone bearing gas being fed to the produced water feedsteam.

6. A method of reducing the concentration of water soluble organics (WSOs) in produced water in the temperature range from 104° F. to 180° F. which comprises feeding into a mass transfer means a feedstream of hot produced water and injecting into the mass transfer means an amount of ozone to substantially render reduction products of the WSOs, the water exiting said mass transfer means in a finely disposed liquid phase, and wherein the ratio of standard cubic feet/hour of ozone to produced water is between from about 0.15 to about 0.60.

7. The method of claim 6 wherein the ratio of standard cubic feet/hour of ozone bearing gas to hot produced water is between from about 0.25 to about 0.45.

8. A method of reducing the oil and grease values of produced water to less than 5 ppm which comprises feeding into a mass transfer means a feedstream of hot produced water and injecting into the mass transfer means an amount of ozone bearing gas for a time sufficient to reduce the oil and grease values of the produced water to less than 5 ppm, the water exiting said mass transfer means in a finely dispersed liquid phase wherein the ratio of standard cubic feet/hour of ozone to produced water is between from about 0.25 to about 0.35, and the temperature of the produced water treated with ozone is between from about 104° F. to about 180° F.

9. A method of reducing the concentration of metals in an aqueous media which comprises feeding into a mass transfer means an aqueous feedstream at a temperature between from about 104° F. to about 180° F. and injecting an ozone bearing gas into the mass transfer means for a time sufficient to reduce the metals concentration in said feedstream, the water exiting said mass transfer means in a finely dispersed liquid phase and wherein the ratio of standard cubic fee/hour of ozone bearing gas to aqueous feedstream is between from about 0.15 to about 0.60.

* * * * *